United States Patent
Kwon et al.

(10) Patent No.: US 10,622,740 B1
(45) Date of Patent: Apr. 14, 2020

(54) CONNECTOR AND DOCKING STRUCTURE BETWEEN VEHICLE BODY AND BATTERY COMPRISING THE SAME

(71) Applicants: Hyundai Motor Company, Seoul (KR); Kia Motors Corporation, Seoul (KR); Yura Co., Ltd, Hwaseong, Gyeonggi-do (KR)

(72) Inventors: Beom Joo Kwon, Gyeonggi-do (KR); Jae Mun Jin, Gyeonggi-do (KR); Yun Jae Jung, Gyeonggi-do (KR); Min Jae Kim, Gyeonggi-do (KR); Seung Woo Yang, Gyeonggi-do (KR); Tae Hong Kim, Gyeonggi-do (KR); Il Kwon Park, Gyeonggi-do (KR); Jae Young Jang, Gyeonggi-do (KR)

(73) Assignees: Hyundai Motor Company, Seoul (KR); Kia Motors Corporation, Seoul (KR); Yura Co., Ltd, Hwaseong, Gyeonggi-do (KR)

( * ) Notice: Subject to any disclaimer, the term of this patent is extended or adjusted under 35 U.S.C. 154(b) by 0 days.

(21) Appl. No.: 16/209,481

(22) Filed: Dec. 4, 2018

(30) Foreign Application Priority Data

Oct. 10, 2018 (KR) ........................ 10-2018-0120658

(51) Int. Cl.
| | |
|---|---|
| *H01R 12/91* | (2011.01) |
| *H01M 2/10* | (2006.01) |
| *H01R 13/05* | (2006.01) |
| *B60L 50/64* | (2019.01) |
| *H01R 13/64* | (2006.01) |

(52) U.S. Cl.
CPC .............. *H01R 12/91* (2013.01); *B60L 50/64* (2019.02); *H01M 2/1083* (2013.01); *H01R 13/052* (2013.01); *H01R 13/64* (2013.01); *H01R 2201/26* (2013.01)

(58) Field of Classification Search
CPC ..................................................... H01R 12/91
See application file for complete search history.

(56) References Cited

U.S. PATENT DOCUMENTS

| | | | | |
|---|---|---|---|---|
| 7,641,516 B1 * | 1/2010 | Scott | ................. | H01R 13/2471 439/607.12 |
| 10,218,130 B1 * | 2/2019 | Jung | .................... | H01R 13/688 |

(Continued)

FOREIGN PATENT DOCUMENTS

| | | |
|---|---|---|
| CN | 101783460 A | 7/2010 |
| CN | 201985360 U | 9/2011 |

(Continued)

OTHER PUBLICATIONS

"Extended European Search Report issued in European Application No. 18210050.3", dated May 13, 2019, 9 pages.

*Primary Examiner* — James Harvey
(74) *Attorney, Agent, or Firm* — Mintz Levin Cohn Ferris Glovsky and Popeo, P.C.; Peter F. Corless (57) ABSTRACT

A connector and a decking structure between a vehicle body and a battery including the same are provided. The connector includes a first connector assembly that has a downwardly protruding guide pin and a second connector assembly that is coupled to the first connector assembly in a lower portion of the first connector assembly and includes a guide aperture in which the guide pin is accommodated.

14 Claims, 6 Drawing Sheets

(56) References Cited

U.S. PATENT DOCUMENTS

| | | | | |
|---|---|---|---|---|
| 2011/0256753 A1* | 10/2011 | Gulla | ............... | H01R 12/91 |
| | | | | 439/378 |
| 2013/0078844 A1* | 3/2013 | Eusterholz | ......... | H01R 13/6315 |
| | | | | 439/362 |
| 2013/0309886 A1* | 11/2013 | Tiberghien | ............. | F16L 37/56 |
| | | | | 439/191 |
| 2016/0268731 A1* | 9/2016 | Ziegenfuss | ........... | H02J 7/0045 |
| 2017/0101019 A1* | 4/2017 | Jung | ................. | B60L 53/22 |
| 2019/0181403 A1* | 6/2019 | Gu | ................. | H01M 2/1077 |
| 2019/0199037 A1* | 6/2019 | Ando | ................. | H01R 13/6397 |
| 2019/0202305 A1* | 7/2019 | Jung | ................. | B60L 53/16 |
| 2019/0288446 A1* | 9/2019 | Park | ................. | H01R 13/629 |

FOREIGN PATENT DOCUMENTS

| | | |
|---|---|---|
| CN | 103199379 B | 12/2016 |
| JP | H10172651 A | 6/1998 |
| KR | 10-2014-0107070 A | 9/2014 |

* cited by examiner

CONNECTOR AND DOCKING STRUCTURE BETWEEN VEHICLE BODY AND BATTERY COMPRISING THE SAME

CROSS REFERENCE TO RELATED APPLICATION

The present application claims priority to Korean Patent Application No. 10-2018-0120658, filed on Oct. 10, 2018, the entire contents of which is incorporated herein for all purposes by this reference.

BACKGROUND

1. Technical Field

The present disclosure relates to a connector and a docking structure between a vehicle body and a battery including the same, and more particularly, to a connector that simplifies a process of assembling a battery to a vehicle body and a docking structure between the vehicle body and the battery including the same.

2. Description of the Related Art

Recently, as interest in environmental problems has increased, technology development and demand for an environment-friendly vehicle that uses an electric energy stored in a battery to drive an electric motor and generate power have been increasing. The environment-friendly vehicle is dependent on distance or time during which it may be operated by one-time battery charging, and thus a large-capacity battery system capable of storing a substantial amount of electric energy is required for environment-friendly vehicles.

However, as the size and the capacity of a battery system are increased, a process of assembling the battery to a lower portion of a vehicle body becomes complex. Since a manual operation for connecting a separate connector is performed after a physical coupling, a connection failure may occur due to negligence or error of an operator.

The contents described as the related art have been provided merely to assist in understanding the background of the present disclosure and should not be considered as corresponding to the related art known to those having ordinary skill in the art.

SUMMARY

An object of the present disclosure is to provide a connector capable of simplifying a process of assembling a battery to a vehicle body and capable of eliminating a risk of misconnection due to a manual operation of a connector and a docking structure between the vehicle body and the battery including the same.

According to an exemplary embodiment of the present disclosure, a connector may include a first connector assembly having a downwardly protruding guide pin; and a second connector assembly coupled to the first connector assembly in a lower portion of the first connector assembly and including a guide aperture in which the guide pin is accommodated.

An end portion of the guide pin may have a shape with a width that gradually decreases toward a lower portion. An entrance of the guide aperture may be formed with an inclined surface having a width that increases toward an upper portion. The connector may further include: a bracket assembly coupled to the first connector assembly in an upper portion of the first connector assembly and configured to couple the first connector assembly to a fixing target. The bracket assembly may include a fixing portion attached to a lower portion of the fixing target and an elastic member having a first end coupled to the fixed portion and a second end coupled to the upper portion of the first connector assembly and compressed and relaxed in a vertical direction.

The first connector assembly may include a first terminal configured to form an electrical connection and a first housing configured to accommodate the first terminal, and the second connector assembly may include a second terminal electrically connected to the first terminal when coupled with the first connector assembly, and a second housing configured to accommodate the second terminal and fastened to the first housing when coupled with the first connector assembly. A length of the guide pin may be determined such that when the first connector assembly and the second connector assembly are coupled, an end portion of the guide pin reaches an entrance of the guide aperture before an end portion of the first housing reaches an end portion of the second housing.

According to an exemplary embodiment of the present disclosure, a docking structure between a vehicle body and a battery may include a battery assembly having a plurality of first guide pins that protrude upwardly; the vehicle body formed with a plurality of first guide apertures configured to accommodate the plurality of first guide pins respectively and having a battery accommodation region to which the battery assembly may be attached; a first connector assembly coupled to the vehicle body and having a second guide pin that protrudes downwardly; and a second connector assembly coupled to the battery assembly, coupled to the first connector assembly in a lower portion of the first connector assembly, and including a second guide aperture in which the second guide pin is accommodated.

An end portion of the second guide pin may have a shape with a width that gradually decreases toward a lower portion. An entrance of the second guide aperture may be formed with an inclined surface having a width that increases toward an upper portion. A width of an upper end of the second guide aperture may be greater than twice a maximum tolerance that may occur in a process of attaching the battery assembly to the vehicle body.

The docking structure may further include: a bracket assembly coupled to the first connector assembly in an upper portion of the first connector assembly and configured to couple the first connector assembly to the vehicle body. The bracket assembly may include a fixing portion attached to a lower portion of the vehicle body and an elastic member having a first end coupled to the fixed portion and a second end coupled to the upper portion of the first connector assembly and compressed and relaxed in a vertical direction. A length of the first guide pin may be determined such that an end portion of the first guide pin reaches an entrance of the first guide aperture before an end portion of the second guide pin reaches an entrance of the second guide aperture in a process of approaching the battery assembly to attach the battery assembly to the vehicle body.

The first connector assembly may include a first terminal configured to form an electrical connection and a first housing configured to accommodate the first terminal, and the second connector assembly may include a second terminal electrically connected to the first terminal when coupled with the first connector assembly, and a second housing configured to accommodate the second terminal and fastened to the first housing when coupled with the first connector assembly. A length of the second guide pin may be determined such that when the first connector assembly and the second connector assembly are coupled, an end portion of the second guide pin reaches an entrance of the second guide aperture before an end portion of the first housing reaches an end portion of the second housing.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a connector and a docking structure between a vehicle body and a battery including the connector according to exemplary embodiments of the present disclosure are described with reference to the accompanying drawings.

Figure 1:
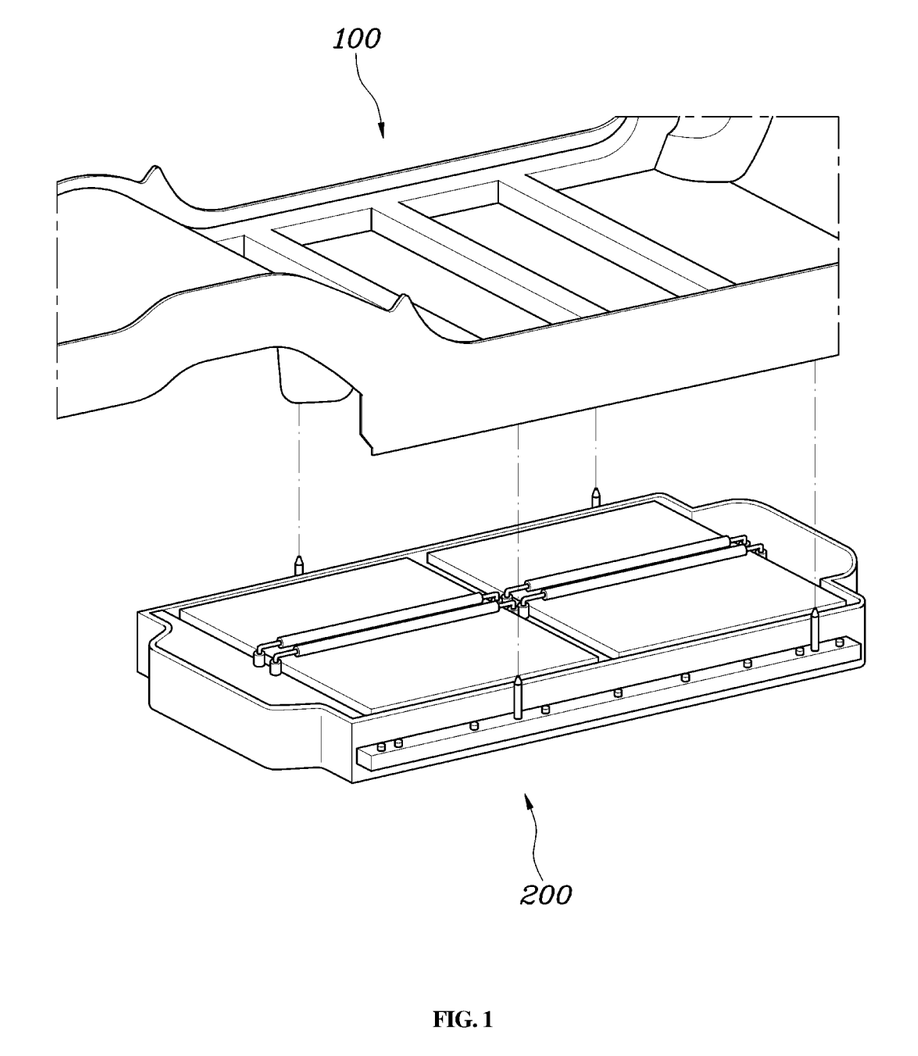
FIG. 1 is a view schematically showing a docking structure between a vehicle body and a battery to which a connector is applied according to an exemplary embodiment of the present disclosure.

FIG. 1 is a view schematically showing a docking structure between a vehicle body 100 and a battery to which a connector is applied according to an exemplary embodiment of the present disclosure. Referring to FIG. 1, the connector and the docking structure between the vehicle body 100 and the battery according to an exemplary embodiment of the present disclosure may have a configuration in which a battery assembly 200 may be fixed to a lower portion of the vehicle body 100. During an assembling process of the battery assembly 200, the battery assembly 200 may be moved up from the lower portion of the vehicle body 100 and may be transferred to the lower portion of the vehicle body 100 to more accurately fix the battery to a battery accommodation region previously provided in the lower portion of the vehicle body 100.

Additionally, coupling of a connector may be performed concurrently in a process of coupling the battery assembly 200 to the vehicle body 100 to thus omit a separate connector coupling process. Various exemplary embodiments of the present disclosure provide the connector that enables electrical coupling of the connector through one process of transferring the battery assembly 200 to the lower portion of the vehicle body 100 to form a physical connection and the docking structure between the vehicle body 100 and the battery including the connector.

Figure 2:
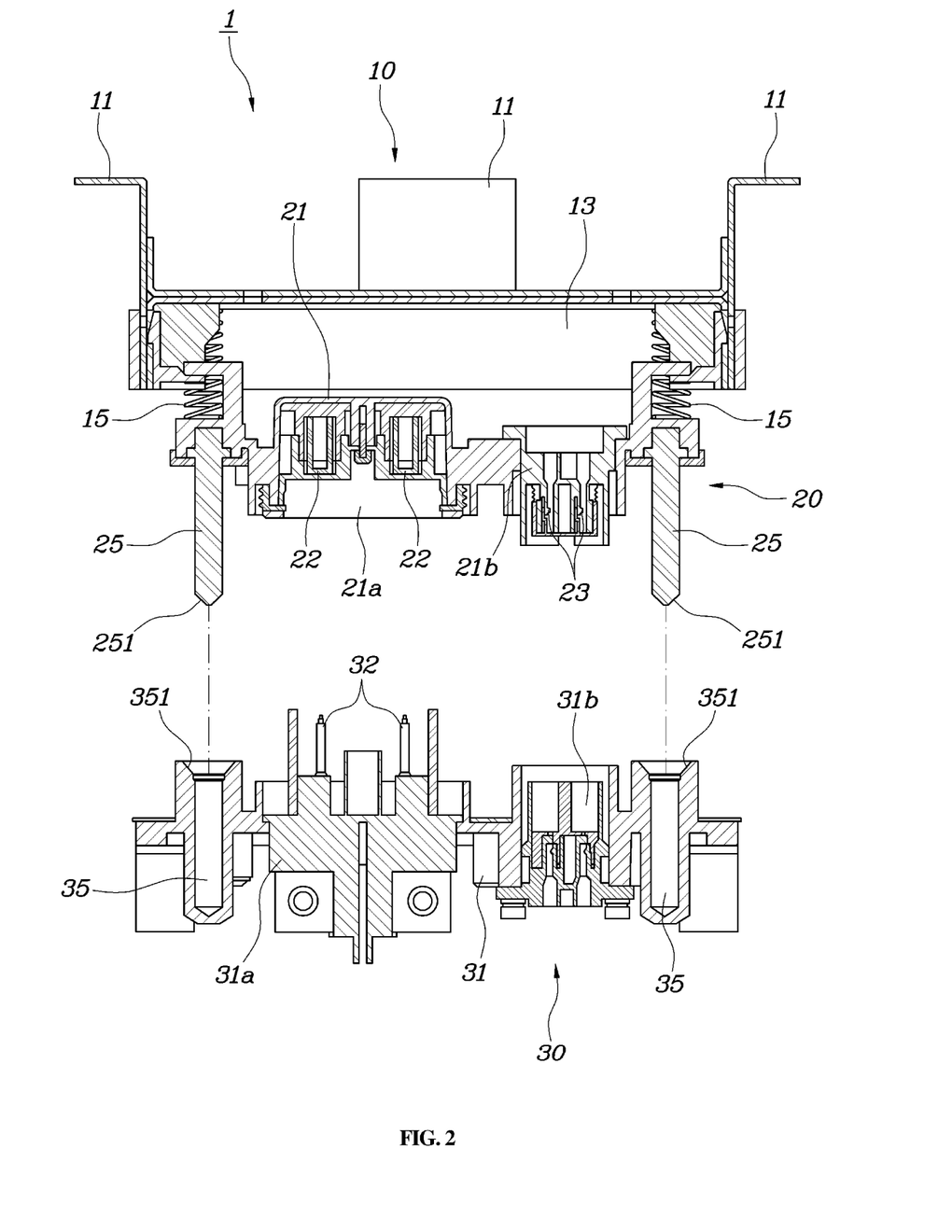
FIG. 2 is a cross-sectional view of a connector according to an exemplary embodiment of the present disclosure.

FIG. 2 is a cross-sectional view of a connector 1 according to an exemplary embodiment of the present disclosure. Referring to FIG. 2, the connector 1 according to an exemplary embodiment of the present disclosure may include a first connector assembly 20 having a guide pin 25 that protrudes downward and a second connector assembly 30 coupled to the first connector assembly 20 in a lower portion of the first connector assembly 20, and including a guide aperture 35 in which the guide pin 25 is accommodated.

In FIG. 2, the first connector assembly 20 may have a female connector structure and the second connector assembly 30 may have a male connector structure, but the structures may be switched as needed. In an exemplary embodiment of the present disclosure, the guide pin 25 and the guide aperture 35 may be respectively provided in the two connector assemblies 20 and 30 which are mutually coupled to each other to more accurately locate a coupling position of the two connector assemblies 20 and 30 in a process of assembling the two connector assemblies 20 and 30. In other words, when the first connector assembly 20 is attached to the vehicle body 100 and the second connector assembly 30 is provided in the battery assembly 200, even when an alignment tolerance of a particular order occurs in an assembling process of the vehicle body 100 and the battery assembly 200, since a coupling position arrangement may be possible by the guide pin 25 and the guide aperture 35 before terminal parts provided in the two connector assemblies 20 and 30 are coupled to each other, the two connector assemblies 20 and 30 may be coupled more accurately.

Figure 3:
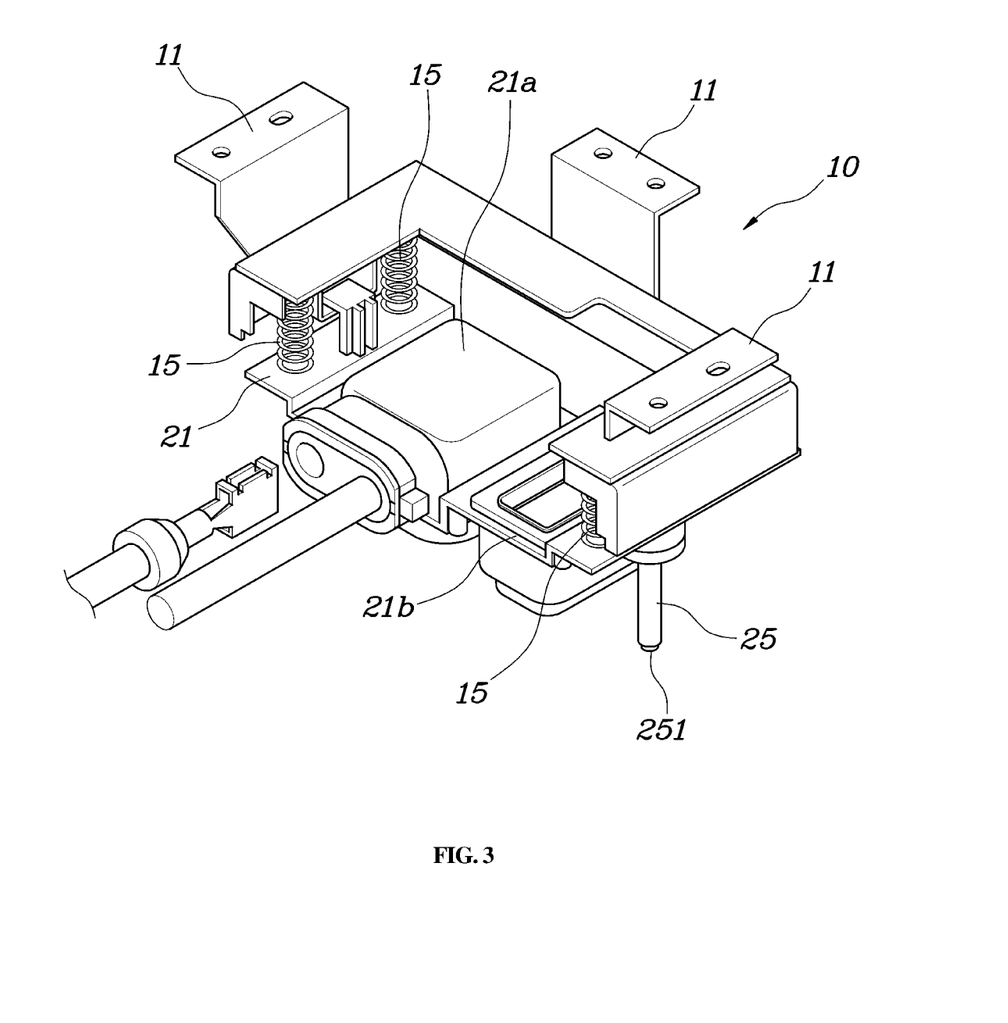
FIG. 3 is a perspective view showing a bracket assembly and a first connector assembly of the connector according to an exemplary embodiment of the present disclosure shown in FIG. 2.
Figure 4:
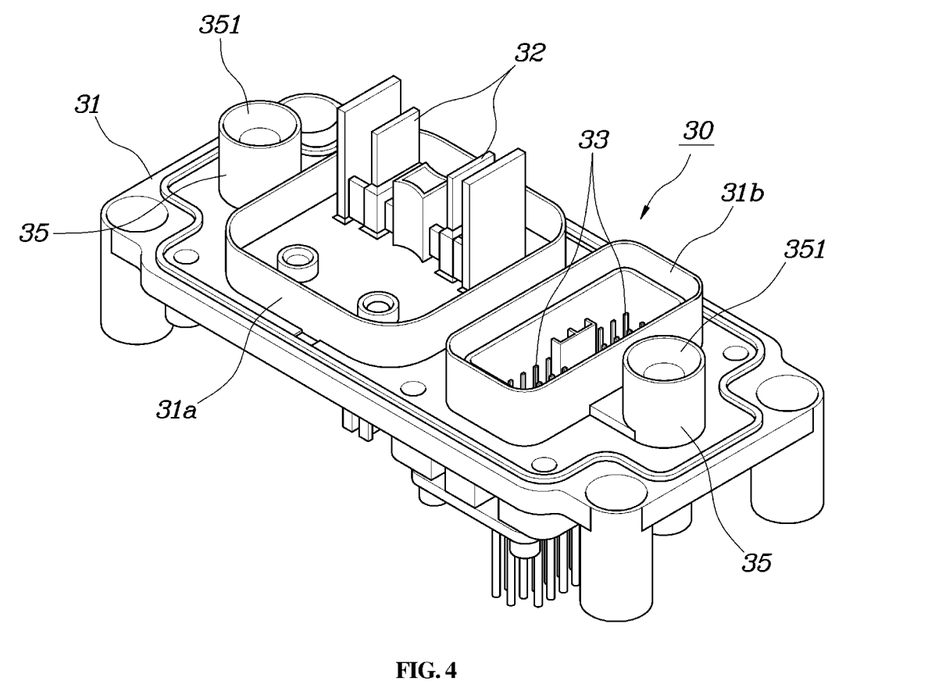
FIG. 4 is a perspective view of a second connector assembly of the connector according to an exemplary embodiment of the present disclosure shown in FIG. 2.

In addition, the connector 1 according to an exemplary embodiment of the present disclosure may further include a bracket assembly 10 coupled to the first connector assembly 20 in an upper portion of the first connector assembly 20 and coupling the first connector assembly 20 to a fixing target (e.g., the vehicle body 100). FIG. 3 is a perspective view showing the bracket assembly 10 and the first connector assembly 20 of the connector 1 according to an exemplary embodiment of the present disclosure shown in FIG. 2. FIG. 4 is a perspective view of the second connector assembly 30 of the connector 1 according to an exemplary embodiment of the present disclosure shown in FIG. 2.

Referring to FIGS. 2 to 4, the respective configurations of the connector 1 will be more specifically described. First, the bracket assembly 10 may include fixing portions 11 and 13 fixed to a fixing target (e.g., the vehicle body 100) by a method such as welding or screw fastening, and an elastic member 15 having one end connected to the fixing portions 11 and 13 and compressed and relaxed in a vertical direction.

The fixing portions 11 and 13 may include a bracket 11 in direct contact with the vehicle body 100 and having a first end fixed to the vehicle body 100 and a bracket holder 13 joined to a second end of the bracket 11 to be spaced apart from the vehicle body 100 by a predetermined distance. A first end of the elastic member 15 may be fixed to the bracket holder 13 and a second end may be coupled to an upper portion of the first connector assembly 20. The elastic member 15 operates to provide an elastic force in the vertical direction, that is, to be compressed and relaxed.

Since a dimensional tolerance of the vehicle body 100 and a tolerance of the battery assembly 200 may be different from each other and mismatch may occur during the coupling, the vehicle body 100 and the battery assembly 200 need to be assembled with a predetermined space to compensate for a mismatch. Since the space may reduce the coupling force between the first connector assembly 20 and the second connector assembly 30, the elastic member 15 may be applied to correct the distance in an exemplary embodiment of the present disclosure. In other words, when the first connector assembly 20 and the second connector assembly 30 are fastened, the elastic member 15, for example, a spring, may provide a repulsive force to the first connector assembly 20 in a direction of the second connector assembly 30, thereby eliminating the influence of the distance and maintaining a high coupling force between the two connector assemblies 20 and 30.

The elastic member 15 may also provide an effect of attenuating vertical direction vibration (e.g., up-and-down direction vibration while the vehicle is being driven) in an environment in which the first connector assembly 20 and the second connector assembly 30 are engaged with each other. The first connector assembly 20 may include a first housing 21 and first terminals 22 and 23 accommodated by the first housing 21 and the guide pin 25. The first terminals 22 and 23 may be manufactured of a metal material to form an electrical connection with a terminal provided in the second connector assembly 30. The first housing 21 may accommodate the first terminals 22 and 23, fix positions of the first terminals 22 and 23 and provide a guide structure for coupling with the second connector assembly 30 and may be implemented of a material such as synthetic resin, plastic, or the like having an insulating property.

In a structure in which the battery assembly 200 incorporates and accommodates a high voltage battery, a low voltage battery, and a controller configured to operate the high voltage battery and the low voltage battery in one case, the connector 1 may be manufactured to be able to transmit a charged voltage, a high voltage, and a control signal. In FIGS. 2 and 3, reference numeral 21a designates a housing for the high voltage in which the high voltage (the charged voltage) comes and goes, and reference numeral 22 designates a terminal for the high voltage. Additionally, in FIGS. 2 and 3, reference numeral 21b designates a housing for a low voltage through which the low voltage or the control signal comes and goes, and reference numeral 23 designates a terminal for the low voltage. As described above, the first connector assembly 20 may include the guide pin 25 that protrudes downward. The guide pin 25 may have a shape (e.g., an inverted conical shape) with a width that decreases toward a lower portion to facilitate insertion into the guide aperture 35.

The second connector assembly 30 may include a second housing 31 and second terminals 32 and 33 and the guide aperture 35. The second housing 31 may fix and accommodate the second terminals 32 and 33 at predetermined positions and may operate as a guide when fastened to the first housing 21. Similar to the first connector assembly 20, the second housing 31 may include a housing 31a for the high voltage in which the terminal 32 for the high voltage may be accommodated in a position that corresponds to the housing 21a for the high voltage of the first connector assembly 20 and a housing 31b for the low voltage in which the terminal 33 for the low voltage may be accommodated in a position that corresponds to the housing 21b for the low voltage of the first connector assembly 20.

The guide aperture 35 may be a space where the guide pin 25 is inserted and accommodated and may be formed with an inclined surface 351 and a width of an entrance of the guide aperture 35 may thus increase toward an upper portion. A width of the uppermost end of the inclined surface 351 may be appropriately determined by an assembly tolerance expected in a process of coupling the vehicle body 100 and the battery assembly 200 together. This will be described again in a description of the docking structure between the vehicle body 100 and the battery according to an exemplary embodiment of the present disclosure to be described later.

Meanwhile, the guide pin 25 may be provided to facilitate an alignment of the two connector assemblies 20 and 30 before the first and second connector assemblies 20 and 30 are fastened to each other and thus may be provided to have a sufficient length. In other words, a length of the guide pin 25 may be determined such that an end of the guide pin 25 reaches an entrance of the guide aperture 35 before an end of the first housing 21 reaches an end of the second housing 31 when the first connector assembly 20 and the second connector assembly 30 are coupled.

Figure 5:
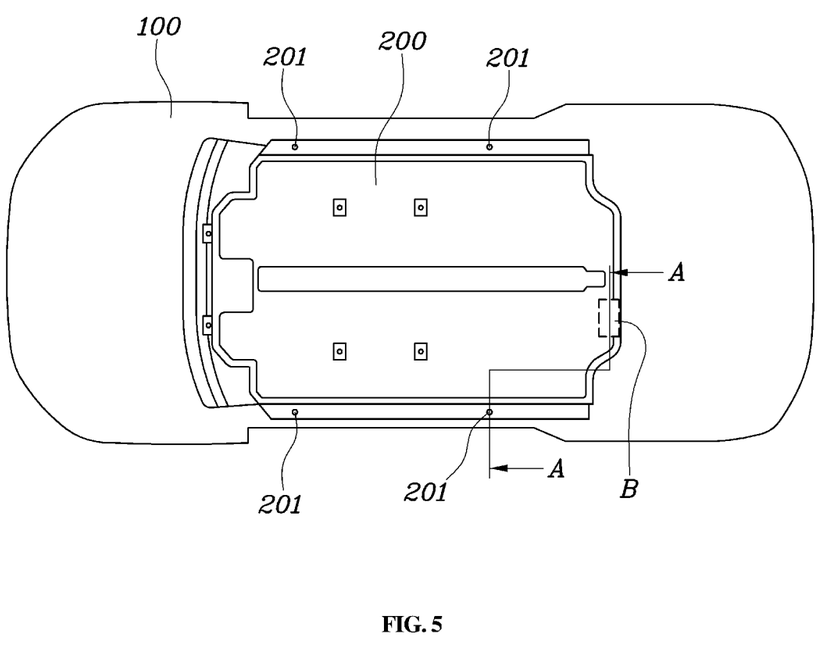
FIG. 5 is a bottom view showing a docking structure between a vehicle body and a battery according to an exemplary embodiment of the present disclosure.
Figure 6:
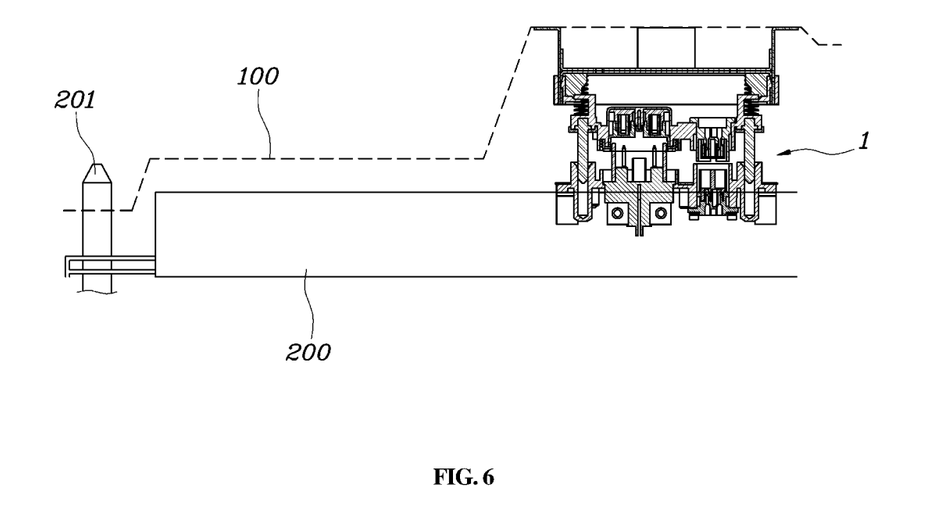
FIG. 6 is a cross-sectional view taken along a line A-A' in the docking structure between the vehicle body and the battery according to an exemplary embodiment of the present disclosure shown in FIG. 5.

FIG. 5 is a bottom view showing a docking structure between the vehicle body 100 and a battery according to an exemplary embodiment of the present disclosure. FIG. 6 is a cross-sectional view taken along a line A-A' in the docking structure between the vehicle body 100 and the battery according to an exemplary embodiment of the present disclosure shown in FIG. 5. Referring to FIGS. 5 and 6, when the battery assembly 200 is coupled to the vehicle body 100, an area occupied by the battery assembly 200 may have a size sufficient to correspond to about half a projection area of the vehicle body 100. To assemble the battery assembly 200 to the vehicle body 100, the entire battery assembly 200 may be transferred horizontally to a battery accommodation region of a lower portion of the vehicle body 100 previously located in an upper portion.

To first reduce a tolerance in a process of determining a position where the battery assembly 200 is disposed, the battery assembly 200 may include a guide pin 201 that protrudes in a direction of the vehicle body 100, i.e. upward. A guide aperture for accommodating the guide pin 201 may be formed in the battery accommodation region of the lower portion of the vehicle body 100. In other words, in a process of assembling the battery assembly 200 to the vehicle body 100, an assembly starts to reduce the tolerance by inserting the guide pins 201 of the battery assembly 200 into the guide aperture of the vehicle body 100.

Moreover, the bracket assembly 10 of the connector 1 may be coupled to the lower portion of the vehicle body 100 and the first connector assembly 20 may be coupled to a lower portion of the bracket assembly 10. The second connector assembly 30 may be disposed in an upper portion of a case of the battery assembly 200. In a process of forming the guide pin 201 of the battery assembly 200 described above, a tolerance in an arrangement position or a diameter of the guide pin 201 of the battery assembly 200 may exist, and a tolerance may exist in a diameter of the guide aperture of the vehicle body 100 for accommodating the guide pin 201, and a tolerance may exist at a position where the bracket assembly 10 is disposed.

In an exemplary embodiment of the present disclosure, the docking structure between the vehicle body 100 and the battery may be completed by fastening the first connector assembly 20 and the second connector assembly 30 of the connector 1 to each other, and thus the first connector assembly 20 and the second connector assembly 30 need to be able to offset the above-mentioned tolerances and be mutually coupled before the first connector assembly 20 and the second connector assembly 30 are fastened to each other. In an exemplary embodiment of the present disclosure, to offset the tolerances and achieve a connector coupling to a precise position, a size of an entrance portion of the guide aperture 35 provided in the second connector assembly 30 may be determined based on the sum of all the tolerances that may be considered in the entire process of assembling the battery assembly 200 to the vehicle body 100.

Figure 7:
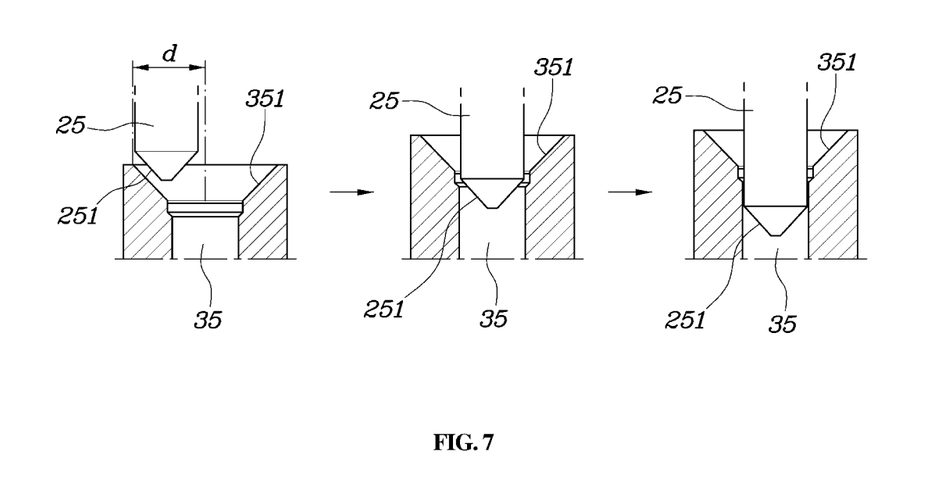
FIG. 7 is a cross-sectional view showing a coupling relationship between a guide pin and a guide aperture of a connector in an assembly process for implementing a docking structure between a vehicle body and a battery according to an exemplary embodiment of the present disclosure.

FIG. 7 is a cross-sectional view showing a coupling relationship between the guide pin 25 and the guide aperture 35 of the connector 1 in an assembly process for implementing a docking structure between the vehicle body 100 and a battery according to an exemplary embodiment of the present disclosure. As shown in FIG. 7, when a radius d of an entrance of the guide aperture 35 provided in the second connector assembly 30, that is, the uppermost radius d of the entrance formed with the inclined surface 351, is determined to be greater than the entire tolerance (e.g., when a width of an upper end of the guide aperture 35 is set to be greater than twice the maximum tolerance), even when the guide pin 25 of the first connector assembly 20 is off of a center of the guide aperture 35 by the maximum tolerance, the guide pin 25 may be inserted into the guide aperture 35 and thus, the connector coupling may be possible.

As described above, since the guide pin 201 of the battery assembly 200 may first be inserted into the guide aperture 35 of the vehicle body 100 in the assembling process of forming the docking structure between the vehicle body 100 and the battery according to an exemplary embodiment of the present disclosure, a length of the guide pin 201 of the first connector assembly 20 may be determined such that an end of the guide pin 201 of the battery assembly 200 reaches an entrance of a guide aperture 35 of the vehicle body 100 before the end of the guide pin 25 of the first connector assembly 20 reaches the entrance of the guide aperture 35 of the second connector assembly 30 in a process of approaching the battery assembly 200 to attach the battery assembly 200 to the vehicle body 100

As described above, a connector and a docking structure between a vehicle body and a battery including the connector according to various exemplary embodiments of the present disclosure may achieve a position arrangement (a physical connection) of a battery assembly and a connector coupling (an electrical connection) using a single process in a process of mounting the battery assembly to the vehicle body. Accordingly, the connector and the docking structure between the vehicle body and the battery including the connector according to various exemplary embodiments of the present disclosure may expect various effects of simplifying a battery assembling process, increasing a storage energy through the enlargement of a battery system applicable to the process, and improving workability related to battery assembly maintenance and repair, etc.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A connector, comprising:
   a first connector assembly having a downwardly protruding guide pin;
   a second connector assembly coupled to the first connector assembly in a lower portion of the first connector assembly and including a guide aperture in which the guide pin is accommodated; and
   a bracket assembly coupled to the first connector assembly in an upper portion of the first connector assembly and configured to couple the first connector assembly to a fixing target,
   wherein the bracket assembly includes:
      a fixing portion attached to a lower portion of the fixing target; and
      an elastic member having a first end coupled to the fixed portion and a second end coupled to the upper portion of the first connector assembly and compressed and relaxed in a vertical direction.

2. The connector of claim 1, wherein an end portion of the guide pin has a width that gradually decreases toward a lower portion.

3. The connector of claim 1, wherein an entrance of the guide aperture is formed with an inclined surface having a width that increases toward an upper portion.

4. A docking structure between a vehicle body and a battery, comprising:
   a battery assembly having a plurality of first guide pins that protrude upwardly;
   the vehicle body formed with a plurality of first guide apertures configured to accommodate the plurality of first guide pins respectively and having a battery accommodation region to which the battery assembly is attached;
   a first connector assembly coupled to the vehicle body and having a second guide pin that protrudes downwardly; and
   a second connector assembly coupled to the battery assembly, coupled to the first connector assembly in a lower portion of the first connector assembly, and including a second guide aperture in which the second guide pin is accommodated.

5. The docking structure of claim 4, wherein a length of the first guide pin is determined such that an end portion of the first guide pin reaches an entrance of the first guide aperture before an end portion of the second guide pin reaches an entrance of the second guide aperture in a process of approaching the battery assembly to attach the battery assembly to the vehicle body.

6. The connector of claim 1, wherein the first connector assembly includes:
 a first terminal configured to form an electrical connection and a first housing configured to accommodate the first terminal,
 wherein the second connector assembly includes a second terminal electrically connected to the first terminal when coupled with the first connector assembly, and a second housing configured to accommodate the second terminal and fastened to the first housing when coupled with the first connector assembly.

7. The connector of claim 6, wherein a length of the guide pin is determined such that when the first connector assembly and the second connector assembly are coupled, an end portion of the guide pin reaches an entrance of the guide aperture before an end portion of the first housing reaches an end portion of the second housing.

8. The docking structure of claim 5, wherein the first connector assembly comprises:
 a first terminal configured to form an electrical connection and a first housing configured to accommodate the first terminal, and
 wherein the second connector assembly includes a second terminal electrically connected to the first terminal when coupled with the first connector assembly, and a second housing configured to accommodate the second terminal and fastened to the first housing when coupled with the first connector assembly.

9. The docking structure of claim 4, wherein an end portion of the second guide pin has a width that gradually decreases toward a lower portion.

10. The docking structure of claim 9, wherein an entrance of the second guide aperture is formed with an inclined surface having a width that increases toward an upper portion.

11. The docking structure of claim 10, wherein a width of an upper end of the second guide aperture is greater than twice a maximum tolerance that occurs in a process of attaching the battery assembly to the vehicle body.

12. The docking structure of claim 4, further comprising:
 a bracket assembly coupled to the first connector assembly in an upper portion of the first connector assembly and configured to couple the first connector assembly to the vehicle body.

13. The docking structure of claim 12, wherein the bracket assembly includes:
 a fixing portion attached to a lower portion of the vehicle body; and
 an elastic member having a first end coupled to the fixed portion and a second end coupled to the upper portion of the first connector assembly and compressed and relaxed in a vertical direction.

14. The docking structure of claim 8, wherein a length of the second guide pin is determined such that when the first connector assembly and the second connector assembly are coupled, an end portion of the second guide pin reaches an entrance of the second guide aperture before an end portion of the first housing reaches an end portion of the second housing.

* * * * *